(12) United States Patent
Desai et al.

(10) Patent No.: US 9,430,530 B1
(45) Date of Patent: Aug. 30, 2016

(54) REUSING DATABASE STATISTICS FOR USER AGGREGATE QUERIES

(71) Applicant: International Business Machines Corporation, Armonk, NY (US)

(72) Inventors: Samar T. Desai, Pune (IN); Dattatreya Govindappanavar, Hirekerur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/950,636

(22) Filed: Nov. 24, 2015

(51) Int. Cl.
*G06F 17/30* (2006.01)
(52) U.S. Cl.
CPC ... *G06F 17/30489* (2013.01); *G06F 17/30412* (2013.01); *G06F 17/30424* (2013.01); *G06F 17/30442* (2013.01); *G06F 17/30463* (2013.01); *G06F 17/30477* (2013.01); *G06F 17/30516* (2013.01)

(58) Field of Classification Search
None
See application file for complete search history.

(56) References Cited

U.S. PATENT DOCUMENTS

| | | | |
|---|---|---|---|
| 7,933,932 B2 | 4/2011 | Singh | |
| 8,224,807 B2 | 7/2012 | Lim et al. | |
| 8,732,138 B2 | 5/2014 | Thomsen | |
| 2002/0198867 A1* | 12/2002 | Lohman | G06F 17/30469 |
| 2005/0125401 A1* | 6/2005 | Carr | G06Q 30/02 |
| 2006/0212436 A1 | 9/2006 | Gupta et al. | |
| 2007/0208690 A1 | 9/2007 | Schneider et al. | |
| 2009/0019005 A1* | 1/2009 | Hu | G06F 17/30457 |
| 2009/0100004 A1* | 4/2009 | Andrei | G06F 17/30424 |
| 2014/0310232 A1 | 10/2014 | Plattner et al. | |
| 2015/0112922 A1 | 4/2015 | Zhou et al. | |

OTHER PUBLICATIONS

Färber et al., "The SAP HANA Database—An Architecture Overview," IEEE Computer Society Technical Committee on Data Engineering Bulletin, 2012, p. 1-6, IEEE.
Mell et al., "The NIST Definition of Cloud Computing," National Institute of Standards and Technology, Sep. 2011, p. 1-3, Special Publication 800-145.

(Continued)

*Primary Examiner* — Anh Tai Tran
(74) *Attorney, Agent, or Firm* — Robert C. Bunker; Mohammed Kashef

(57) ABSTRACT

A method for determining and providing aggregate functions is provided. The method may include scanning database tables. The method may further include determining the aggregate functions. Additionally, the method may include storing the determined aggregate functions on system catalog tables. The method may also include providing indications that the stored determined aggregate functions are valid. The method may further include receiving database queries. The method may also include, determining whether the stored determined aggregate functions are valid. The method may further include, in response to the stored determined aggregate functions being valid, retrieving the stored determined aggregate functions from the system catalog tables. The method may also include, in response to the stored determined aggregate functions being invalid, re-scanning the database tables. The method may further include determining the aggregate functions based on the re-scanned database tables. The method may further include presenting the aggregate functions to clients.

20 Claims, 6 Drawing Sheets

(56) References Cited

OTHER PUBLICATIONS

MongoDB, "Real-Time Analytics," Giant Ideas Brought to Life, p. 1-4, MongoDB Inc., https://www.mongodb.com/use-cases, Accessed on Oct. 6, 2015.

Taylor, "How Real-Time Analytics Works—A Step-by-step Breakdown," FusionBrew—The FusionCharts Blog, Nov. 5, 2013, p. 1-4, InfoSoft Global Private Limited, http://blog.fusioncharts.com/2013/11/how-real-time-analytics-works-a-step-by-step-breakdown/, Accessed on Oct. 6, 2015.

* cited by examiner

REUSING DATABASE STATISTICS FOR USER AGGREGATE QUERIES

BACKGROUND

The present invention relates generally to the field of computing, and more specifically, to data collection and query.

Generally, information associated with databases may be collected and organized using database tables. The collected information may include statistics such as a number of records associated with the databases, a number of pages associated with the databases, and average record lengths. Furthermore, database queries based on aggregate functions such as min, max, and range, may be initiated to retrieve the statistics associated with the database tables. For example, a database query may be initiated using an aggregate function, such as "select min(coll) from tab", whereby min( ) is the aggregate function, to determine the minimum values associated with a database table. As such, based on the database query, the server may scan the data from coll of each row associated with the database table. Thereafter, the scanned data associated with coll is sorted and the minimum values associated with coll are determined.

SUMMARY

A method for determining and providing a plurality of aggregate functions is provided. The method may include scanning at least one database table. The method may further include determining the plurality of aggregate functions associated with the at least one database table. Additionally, the method may include storing the determined plurality of aggregate functions on at least one system catalog table. The method may also include providing at least one indication that the stored determined plurality of aggregate functions are valid. The method may further include receiving at least one database query associated with the at least one database table. The method may also include, based on the received at least one database query, determining whether the stored determined plurality of aggregate functions are valid. The method may further include, in response to the determination that the stored determined plurality of aggregate functions are valid, retrieving the stored determined plurality of aggregate functions from the at least one system catalog. The method may also include, in response to the determination that the stored determined plurality of aggregate functions are invalid, re-scanning the at least one database table. The method may further include determining the plurality of aggregate functions based on the re-scanned at least one database table. The method may further include presenting the determined plurality of aggregate functions based on the re-scanned at least one database table and the stored determined plurality of aggregate functions retrieved from the at least one system catalog table to at least one client.

A computer system for determining and providing a plurality of aggregate functions is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include scanning at least one database table. The method may further include determining the plurality of aggregate functions associated with the at least one database table. Additionally, the method may include storing the determined plurality of aggregate functions on at least one system catalog table. The method may also include providing at least one indication that the stored determined plurality of aggregate functions are valid. The method may further include receiving at least one database query associated with the at least one database table. The method may also include, based on the received at least one database query, determining whether the stored determined plurality of aggregate functions are valid. The method may further include, in response to the determination that the stored determined plurality of aggregate functions are valid, retrieving the stored determined plurality of aggregate functions from the at least one system catalog. The method may also include, in response to the determination that the stored determined plurality of aggregate functions are invalid, re-scanning the at least one database table. The method may further include determining the plurality of aggregate functions based on the re-scanned at least one database table. The method may further include presenting the determined plurality of aggregate functions based on the re-scanned at least one database table and the stored determined plurality of aggregate functions retrieved from the at least one system catalog table to at least one client.

A computer program product for determining and providing a plurality of aggregate functions is provided. The computer program product may include one or more computer-readable storage devices and program instructions stored on at least one of the one or more tangible storage devices, the program instructions executable by a processor. The computer program product may include program instructions to scan at least one database table. The computer program product may also include program instructions to determine the plurality of aggregate functions associated with the at least one database table. Additionally, the computer program product may further include program instructions to store the determined plurality of aggregate functions on at least one system catalog table. The computer program product may also include program instructions to provide at least one indication that the stored determined plurality of aggregate functions are valid. The computer program product may further include program instructions to receive at least one database query associated with the at least one database table. The computer program product may also include program instructions to, based on the received at least one database query, determine whether the stored determined plurality of aggregate functions are valid. The computer program product may further include program instructions to, in response to the determination that the stored determined plurality of aggregate functions are valid, retrieve the stored determined plurality of aggregate functions from the at least one system catalog. The computer program product may also include program instructions to, in response to the determination that the stored determined plurality of aggregate functions are invalid, to re-scan the at least one database table. The computer program product may further include program instructions to determine the plurality of aggregate functions based on the re-scanned at least one database table. The computer program product may also include program instructions to present the determined plurality of aggregate functions based on the re-scanned at least one database table and the stored determined plurality of aggregate functions retrieved from the at least one system catalog table to at least one client.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
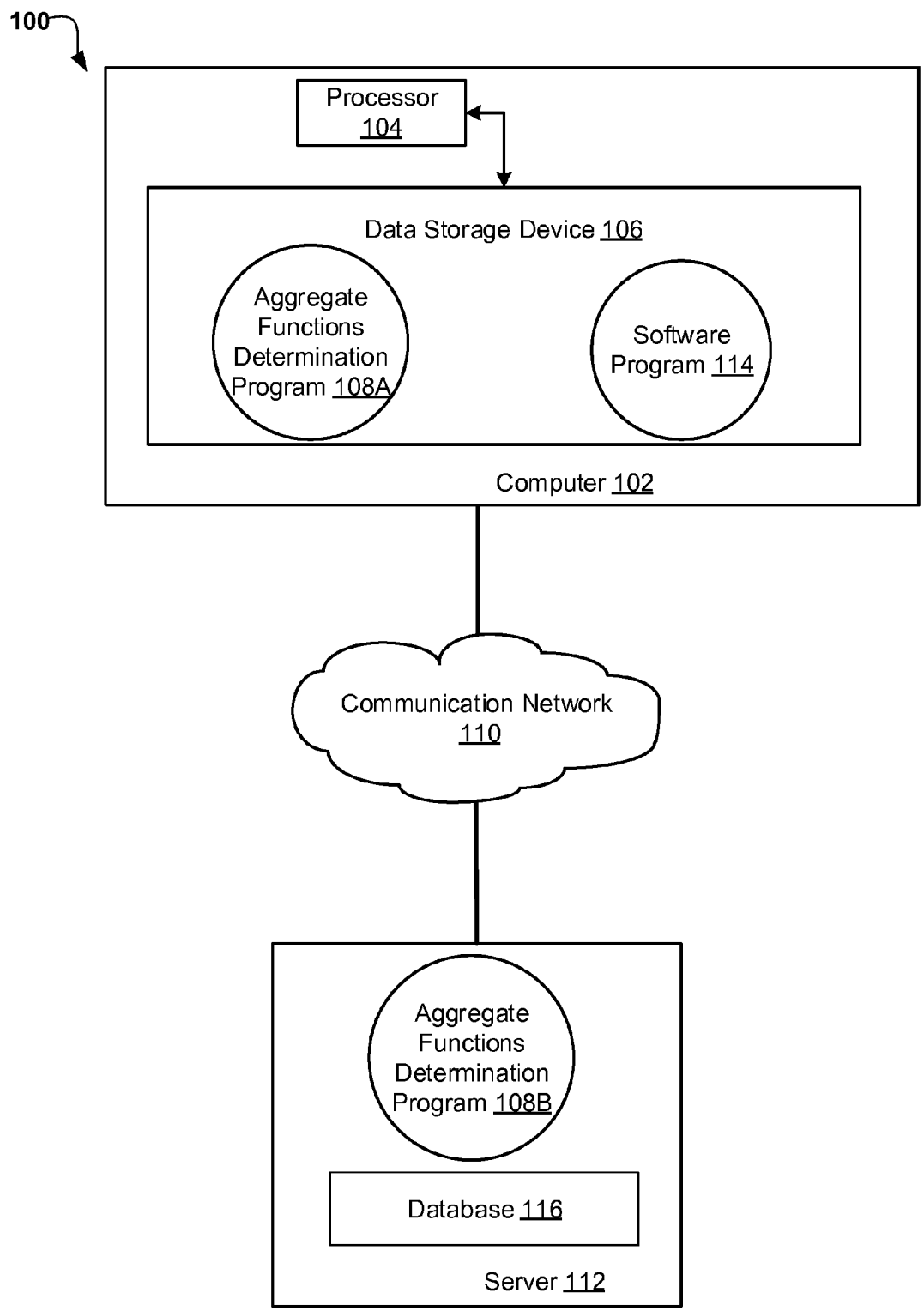
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to data collection and query. The following described exemplary embodiments provide a system, method and program product for determining and providing aggregate functions associated with database tables. Therefore, the present embodiment has the capacity to improve the technical field associated with determining aggregate functions associated with database tables by reducing the time to calculate and provide aggregate functions associated with database tables in response to database queries. Specifically, the present embodiment may scan database tables, and determine and store the aggregate functions associated with the database tables, as well as provide the determined and stored aggregate functions to clients in response to database queries.

As previously described, database queries may be initiated to determine statistics associated with database tables. Specifically, database queries may be initiated to determine aggregate functions such as min values, max values, and ranges of values associated with database tables. As such, based on the database queries, servers may scan the rows for statistics associated with the database tables to determine the values associated with the aggregate functions. However, for large database tables, such as database tables that include 10 million rows, the process to scan and determine the values for the aggregate functions is time consuming. Specifically, for the database queries associated with large database tables, the inputs/outputs (IO) and CPU processing time to scan and determine the aggregate functions is consuming. As such, it may be advantageous, among other things, to provide a system, method and program product for determining aggregate functions associated with database tables. Specifically, database tables may be scanned to update and collect statistics associated with the database tables, and based on the collected statistics, aggregate functions may be calculated and stored on catalog tables for retrieval in response to database queries.

According to at least one implementation of the present embodiment, database tables may be scanned. Then, data may be identified. Next, aggregate functions associated with the database tables may be determined. Then, the determined aggregate functions may be stored. Thereafter, notifications indicating that the aggregate functions are valid may be provided. Additionally, database queries may be received. Next, the notifications indicating that the aggregate functions are valid may be checked. Then, if the aggregate functions are valid, the aggregate functions may be retrieved. If the aggregate functions are not valid, then the database tables may be scanned. Next, data based on the scanned database tables may be sorted. Then, the aggregate functions may be determined. Next, database query results may be presented to the client.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for determining and providing aggregate functions associated with database tables.

According to at least one implementation, database tables may be scanned. Then, data associated with the database tables may be identified. Next, aggregate functions associated with the identified data may be determined. Then, the determined aggregate functions may be stored. Thereafter, notifications indicating that the determined aggregate functions are valid may be triggered. Additionally, database queries may be received. Next, the notifications indicating that the aggregate functions are valid may be checked. Then, if the aggregate functions are valid, the aggregate functions may be retrieved. If the aggregate functions are not valid, then the database tables may be scanned. Next, data based on the scanned database tables may be sorted. Then, based on the sorted data, the aggregate functions may be determined. Next, database query results may be presented to the client.

Referring now to FIG. 1, an exemplary networked computer environment 100 in accordance with one embodiment is depicted. The networked computer environment 100 may include a computer 102 with a processor 104 and a data storage device 106 that is enabled to run an aggregate functions determination program 108A and a software program 114. The software program 114 may be an application program such as an internet browser and an email program. The aggregate functions determination program 108A may communicate with the software program 114. The networked computer environment 100 may also include a server 112 that is enabled to run an aggregate functions determination program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the aggregate functions determination program 108A, 108B may interact with a database 116 that may be embedded in various storage devices, such as, but not limited to a mobile device 102, a networked server 112, or a cloud storage service.

According to the present embodiment, a program, such as an aggregate functions determination program 108A and 108B may run on the client computer 102 or on the server computer 112 via a communications network 110. The aggregate functions determination program 108A, 108B may determine and provide aggregate functions associated with database tables. Specifically, a user using a computer, such as computer 102, may run an aggregate functions determination program 108A, 108B, that interacts with a software program 114, such as Firefox® (Firefox and all Firefox—based trademarks and logos are trademarks or registered trademarks of Firefox and/or its affiliates) to scan database tables, and determine and store the aggregate functions associated with the database tables, as well as provide the determined and stored aggregate functions to clients in response to database queries.

Figure 2:
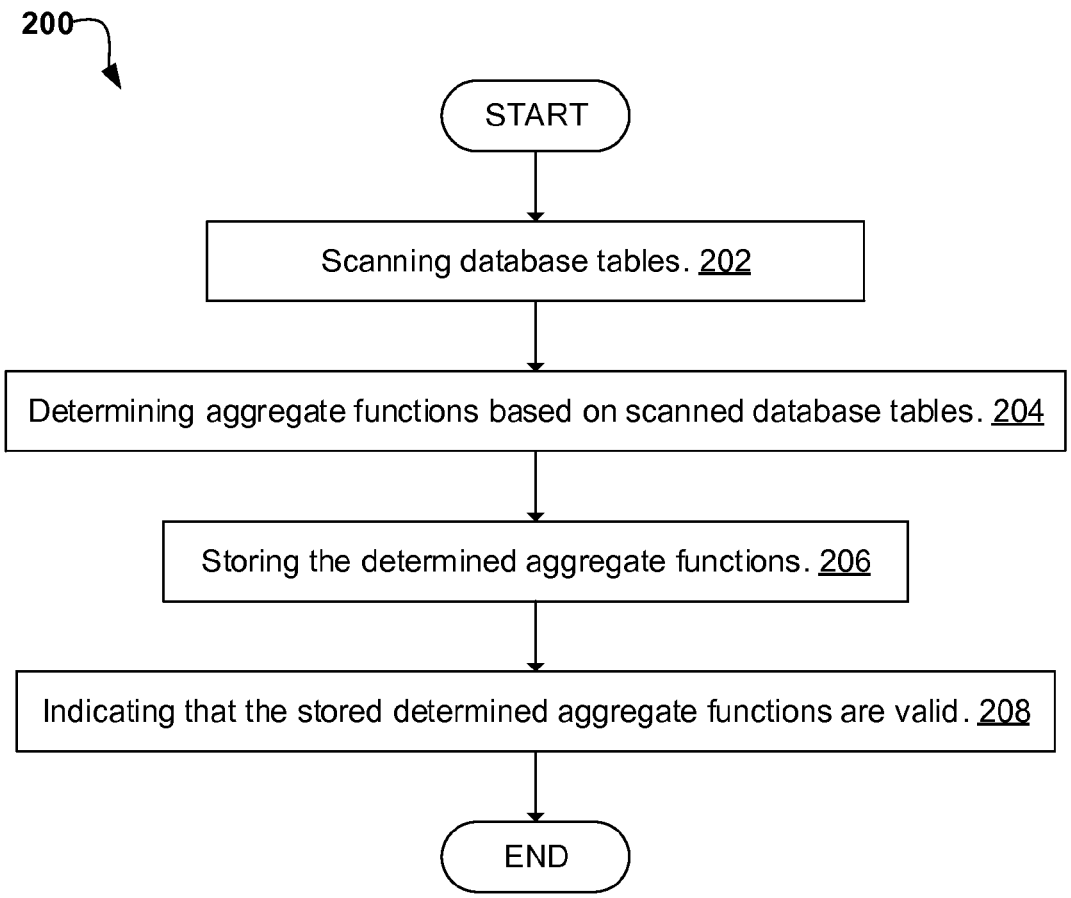
FIG. 2 is an operational flowchart illustrating the steps carried out by a program for determining and storing aggregate functions associated with database tables according to one embodiment.

Referring now to FIG. 2, an operational flowchart 200 that illustrates the steps carried out by a program for determining and storing the aggregate functions associated with database tables in accordance with one embodiment is depicted. At 202, the aggregate functions determination program 108A, 108B (FIG. 1) may scan database tables. Specifically, the aggregate functions determination program 108A, 108B (FIG. 1) may use a command, such as RUNSTATS® (RUNSTATS and all RUNSTATS—based trademarks and logos are trademarks or registered trademarks of IBM and/or its affiliates), to scan database tables and collect statistics associated with database tables. More specifically, the aggregate functions determination program 108A, 108B (FIG. 1) may use the RUNS TATS® command to collect statistics such as the number of records, the number of pages, the average record length, and the number of numeric rows and columns associated with the database tables. For example, the aggregate functions determination program 108A, 108B (FIG. 1) may use the RUNS TATS® command to scan a database table associated with employee statistics that may include data and columns such as first names, last names, addresses, and salaries.

Then, at 204, the aggregate functions determination program 108A, 108B (FIG. 1) may determine the aggregate functions based on the scanned database tables. As previously described at step 202, the aggregate functions determination program 108A, 108B (FIG. 1) may use a command such as RUNSTATS® to scan and collect statistics associated with database tables. Furthermore, based on the scanned and collected statistics, the aggregate functions determination program 108A, 108B (FIG. 1) may use the RUNSTATS® command to also calculate and determine aggregate functions associated with the database tables. Specifically, the aggregate functions determination program 108A, 108B (FIG. 1) may calculate aggregate functions such as the min( ), the max( ), and the range( ) of data that is associated with the scanned database tables. For example, the aggregate functions determination program 108A, 108B (FIG. 1) may scan and collect the data associated with a database table that may include employee information such as employee salaries. As such, the aggregate functions determination program 108A, 108B (FIG. 1) may use the RUNSTATS® command to calculate and determine aggregate functions associated with the scanned employee information such as the average salary of employees, the maximum salary of employees, and the minimum salary of employees.

Next, at 206, the aggregate functions determination program 108A, 108B (FIG. 1) may store the determined aggregate functions. As previously described at step 204, the aggregate functions determination program 108A, 108B (FIG. 1) may determine the aggregate functions associated with database tables. Specifically, the aggregate functions determination program 108A, 108B (FIG. 1) may use a command such as RUNSTATS® to calculate and determine the aggregate functions. Furthermore, the aggregate functions determination program 108A, 108B (FIG. 1) may also store the calculated and determined aggregate functions on system catalog tables associated with the database tables. For example, the aggregate functions determination program 108A, 108B (FIG. 1) may scan and collect information associated with a database table that may include sales data. Additionally, the aggregate functions determination program 108A, 108B (FIG. 1) may calculate and determine aggregate functions associated with the scanned sales data such as the average sales, the maximum sales, and the minimum sales. Thereafter, the aggregate functions determination program 108A, 108B (FIG. 1) may store the determined average sales, the determined maximum sales, and the determined minimum sales on system catalog tables associated with the sales data of a database table.

Then, at 208, the aggregate functions determination program 108A, 108B (FIG. 1) may provide indications that the determined and stored aggregate functions are valid. As previously described at step 206, the aggregate functions determination program 108A, 108B (FIG. 1) may store the determined aggregate functions associated with the database tables. As such, the aggregate functions determination program 108A, 108B (FIG. 1) may indicate that the stored and determined aggregate functions are valid. Specifically, the aggregate functions determination program 108A, 108B (FIG. 1) may use table control blocks (TCBs) that may include flag icons associated with the system catalog tables and the database tables to indicate that the determined aggregate functions that are stored on the system catalog tables are valid. For example, and as previously described at step 206, the aggregate functions determination program 108A, 108B (FIG. 1) may store the determined average sales, the determined maximum sales, and the determined minimum sales on system catalog tables associated with the sales data of a database table. Therefore, the aggregate functions determination program 108A, 108B (FIG. 1) may activate, or turn on, flag icons on the table control block (TCB) to indicate that the determined and stored aggregate functions are valid.

Figure 3:
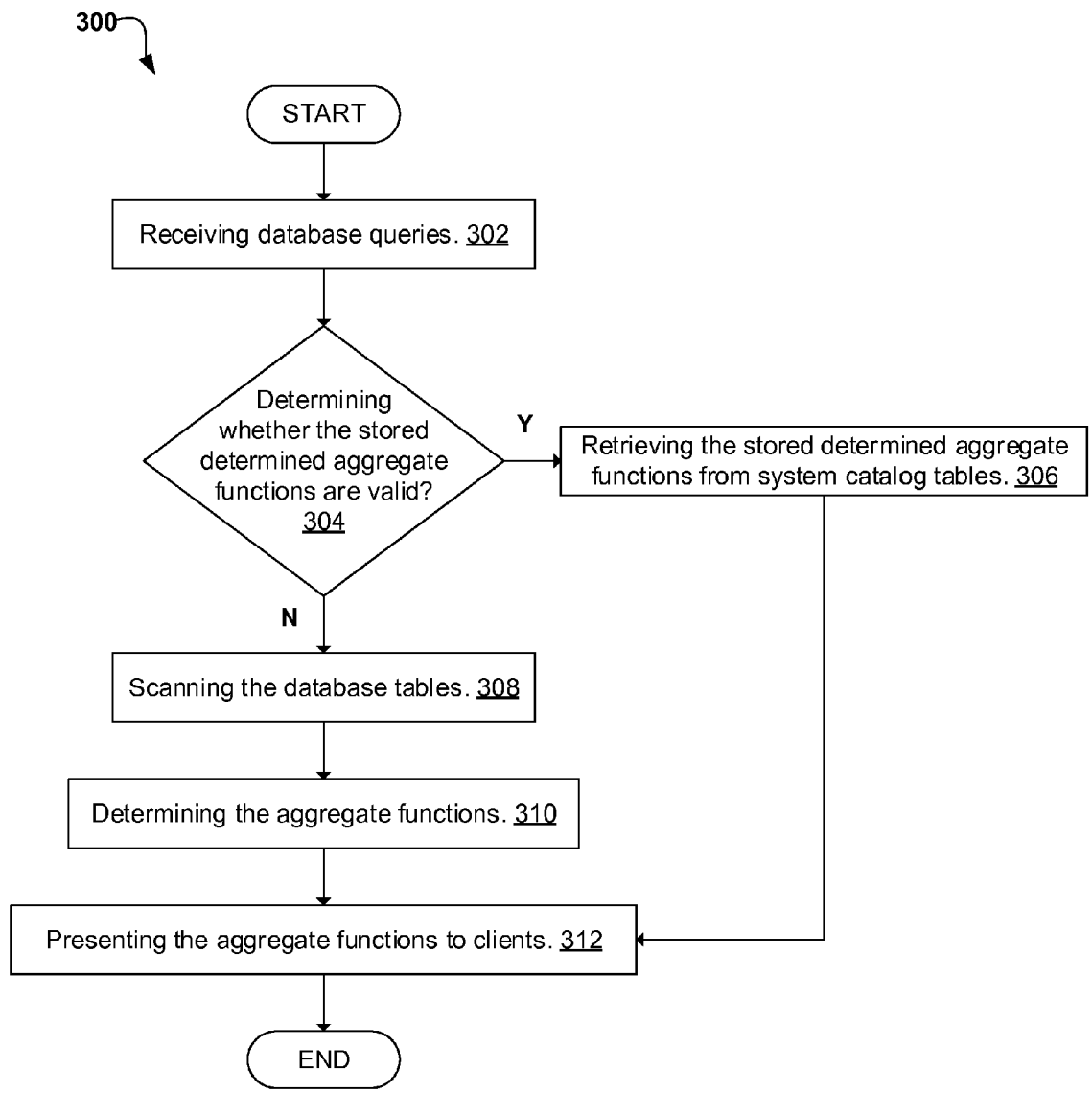
FIG. 3 is an operational flowchart illustrating the steps carried out by a program for providing the aggregate functions associated with the database tables according to one embodiment.

Referring now to FIG. 3, an operational flowchart 300 illustrating the steps carried out by a program for providing the aggregate functions associated with the database tables is depicted. At 302, the aggregate functions determination program 108A, 108B (FIG. 1) may receive database queries associated with the database tables. For example, based on a database table that may include employee data, the aggregate functions determination program 108A, 108B (FIG. 1) may receive database queries to find the average salary of employees, the maximum salary of employees, and/or the minimum salary of employees associated with the employee data.

Next, at 304, the aggregate functions determination program 108A, 108B (FIG. 1) may determine whether the stored determined aggregate functions associated with the database queries are valid. Specifically, the aggregate functions determination program 108A, 108B (FIG. 1) may determine whether the aggregate functions are valid by determining whether the flag icons are activated on the TCB. As previously described at step 208 in FIG. 2, the aggregate functions determination program 108A, 108B (FIG. 1) may indicate that the aggregate functions stored on the system catalog tables are valid by activating flag icons on the TCB associated with the system catalog tables and database tables. Therefore, in the previous example, the aggregate functions determination program 108A, 108B (FIG. 1) may determine whether the stored determined aggregate functions associated with the database queries, that may include finding the average salary of employees, the maximum salary of employees, and/or the minimum salary of employees, are valid by determining whether the flag icons on the TCB that are associated with the database table are activated.

Thereafter, at step 306, in response to the determination that the aggregate functions are valid, the aggregate functions determination program 108A, 108B (FIG. 1) may retrieve the determined aggregate functions from the system catalog tables. As previously described at step 304, the aggregate functions determination program 108A, 108B (FIG. 1) may determine whether the aggregate functions are valid by determining whether the flag icons on the TCB are activated. As such, in response to the determination that the flag icons are activated, the aggregate functions determination program 108A, 108B (FIG. 1) may look up and retrieve the aggregate functions from the system catalog tables based on the database queries.

For example, and as previously described in steps 204 (FIG. 2) and 206 (FIG. 2), based on a RUNSTATS® scan of a database table that may include employee data, the aggregate functions determination program 108A, 108B (FIG. 1) may determine aggregate functions such as the average salary of employees, the maximum salary of employees, and/or the minimum salary of employees associated with the employee data, and store the determined aggregate functions on system catalog tables. Furthermore, the aggregate functions determination program 108A, 108B (FIG. 1) may indicate that the determined aggregate functions are valid by activating flag icons on the TCB. Thereafter, the aggregate functions determination program 108A, 108B (FIG. 1) may receive a database query to find the average salary of employees. As such, in response to a determination that the aggregate functions are valid by determining that the TCB flag icons are activated, the aggregate functions determination program 108A, 108B (FIG. 1) may look up and retrieve the determined aggregate functions that are associated with the average salary of employees from the system catalog tables.

Alternatively, at 308, in response to the determination that the aggregate functions are not valid, the aggregate functions determination program 108A, 108B (FIG. 1) may scan database tables based on the database queries. More specifically, in response to the determination that the flag icons on the TCB are not activated, the aggregate functions determination program 108A, 108B (FIG. 1) may scan the database tables to determine the aggregate functions based on the database queries. For example, and as previously described at step 302, the aggregate functions determination program 108A, 108B (FIG. 1) may receive a database query to find the maximum salary for employees. Thereafter, the aggregate functions determination program 108A, 108B (FIG. 1) may determine whether the aggregate function associated with the maximum salary for employees are valid by determining whether the flag icons are activated on the TCB. Then, in response to the determination that the flag icons on the TCB are not activated, the aggregate functions determination program 108A, 108B (FIG. 1) may scan the database tables associated with employee data to find the maximum salary for employees.

Next, at 310, the aggregate functions determination program 108A, 108B (FIG. 1) may determine the aggregate functions based on the scanned database tables. As previously described at step 308, in response to the determination that the flag icons on the TCB are not activated, the aggregate functions determination program 108A, 108B (FIG. 1) may scan the database tables. As such, based on the scanned database tables, the aggregate functions determination program 108A, 108B (FIG. 1) may determine the aggregate functions. For example, and as previously described, the aggregate functions determination program 108A, 108B (FIG. 1) may determine that the aggregate function associated with the average salary for employees are not valid by determining that the flag icons are not activated on the TCB. As such, the aggregate functions determination program 108A, 108B (FIG. 1) may scan the database tables associated with employee data to determine the aggregate function based on the database queries to find the average salary for employees.

Then, at 312, the aggregate functions determination program 108A, 108B (FIG. 1) may present the database query results to clients. Specifically, the aggregate functions determination program 108A, 108B (FIG. 1) may present the determined aggregate functions to the clients based on the received database queries. As previously described at step 302, the aggregate functions determination program 108A, 108B (FIG. 1) may receive database queries. Thereafter, and as previously described at step 306, the aggregate functions determination program 108A, 108B (FIG. 1) may look up and retrieve the determined aggregate functions from the system catalog tables based on the database queries. Alternatively, at step 310, the aggregate functions determination program 108A, 108B (FIG. 1) may scan the database tables to determine the aggregate functions. As such, the aggregate functions determination program 108A, 108B (FIG. 1) may present the determined aggregate actions from the system catalog tables, and alternatively, present the determined aggregate functions based on the scanned database tables.

It may be appreciated that FIGS. 2 and 3 provide only illustrations of one implementation and do not imply any limitations with regard to how different embodiments may be implemented. Many modifications to the depicted environments may be made based on design and implementation requirements. Specifically, according to one implementation, the aggregate functions determination program 108A, 108B (FIG. 1) may receive updates, inserts and deletes to the determined aggregate functions. As such, the aggregate functions determination program 108A, 108B (FIG. 1) may deactivate, or turn off, the flag icons on the TCBs that are associated with the determined aggregate functions to indicate that the determined aggregate functions are not valid.

Figure 4:
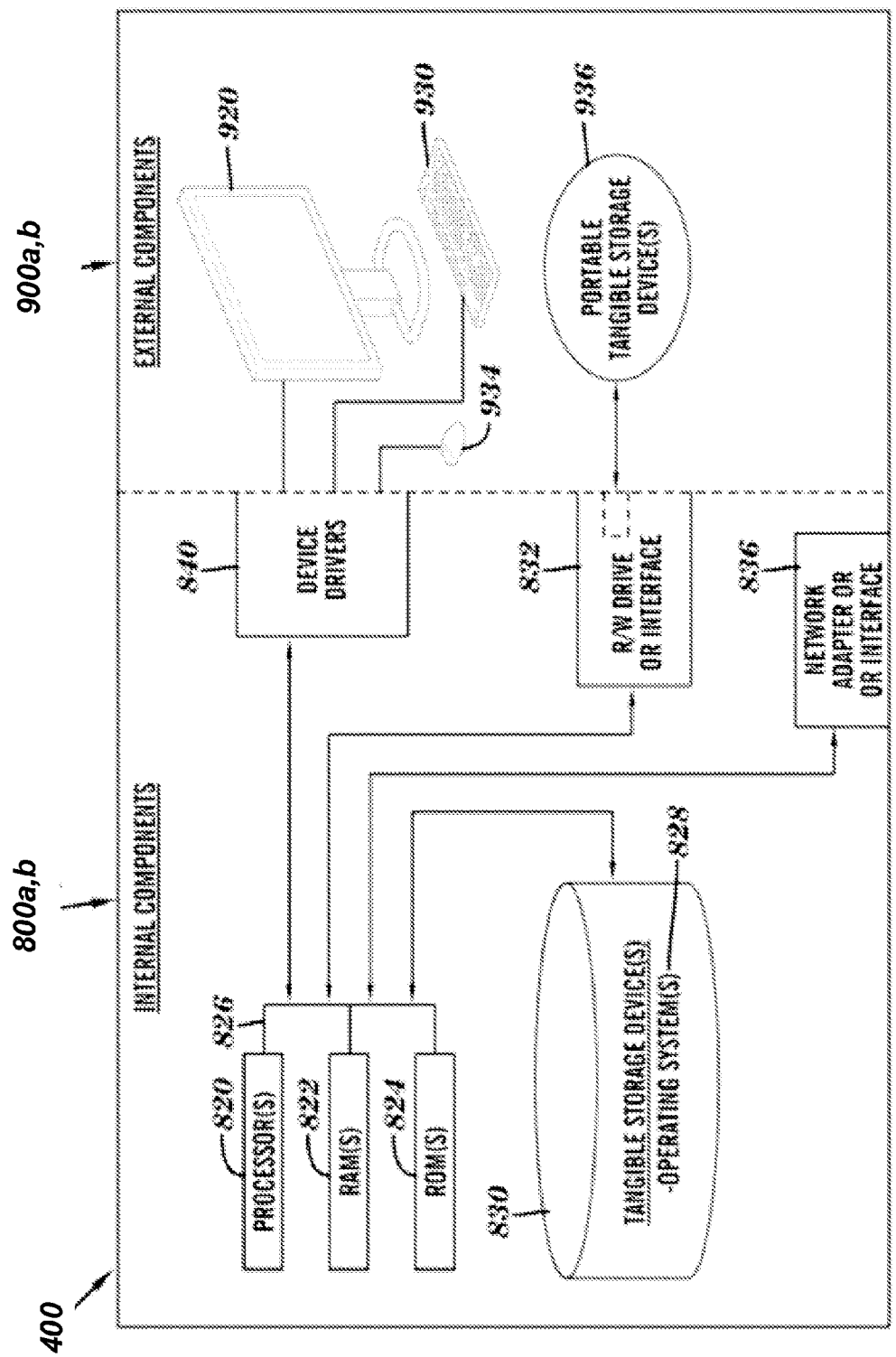
FIG. 4 is a block diagram of the system architecture of a program for determining and providing aggregate functions associated with database tables according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the aggregate functions determination program 108A (FIG. 1) in client computer 102 (FIG. 1), and the aggregate functions determination program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as an aggregate functions determination program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The aggregate functions determination program 108A (FIG. 1) and software program 114 (FIG. 1) in client computer 102 (FIG. 1), and the aggregate functions determination program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the aggregate functions determination program 108A (FIG. 1) and software program 114 (FIG. 1) in client computer 102 (FIG. 1) and the aggregate functions determination program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
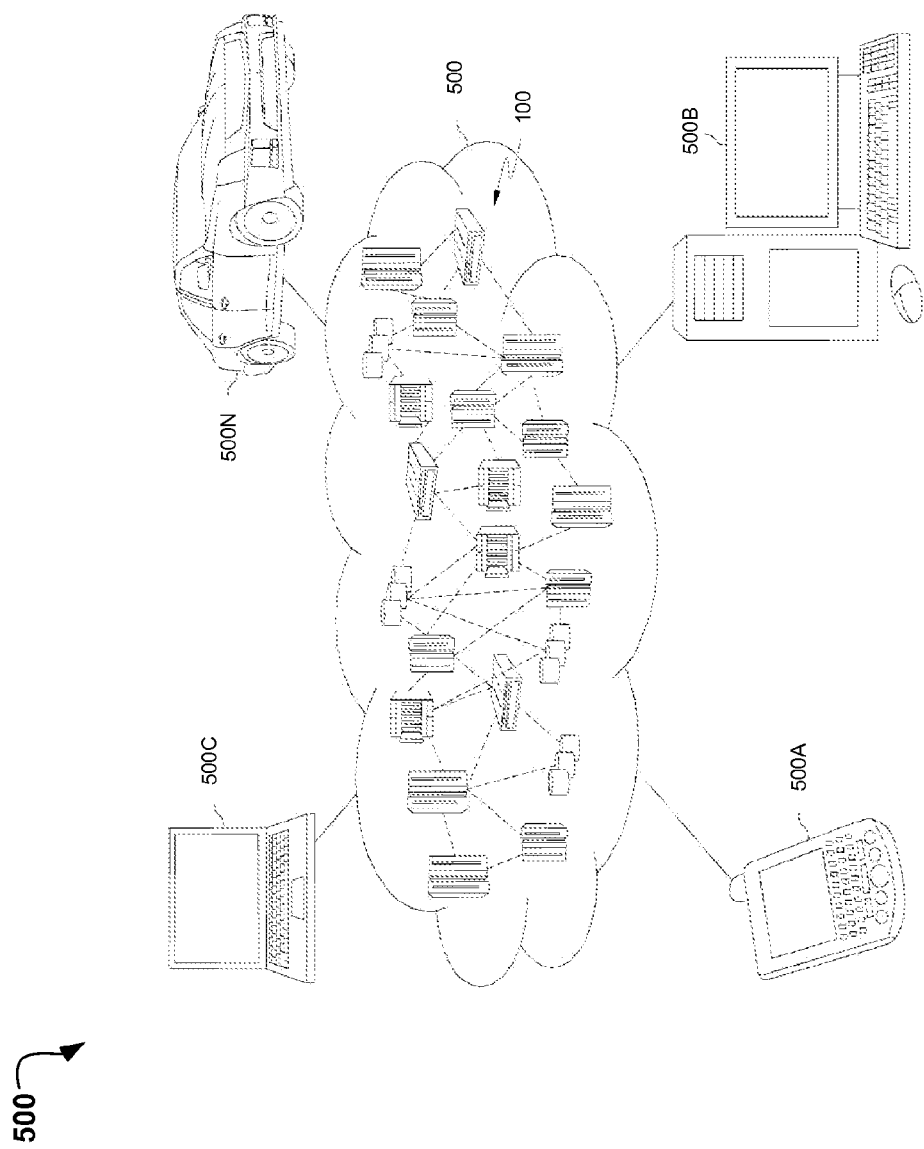
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
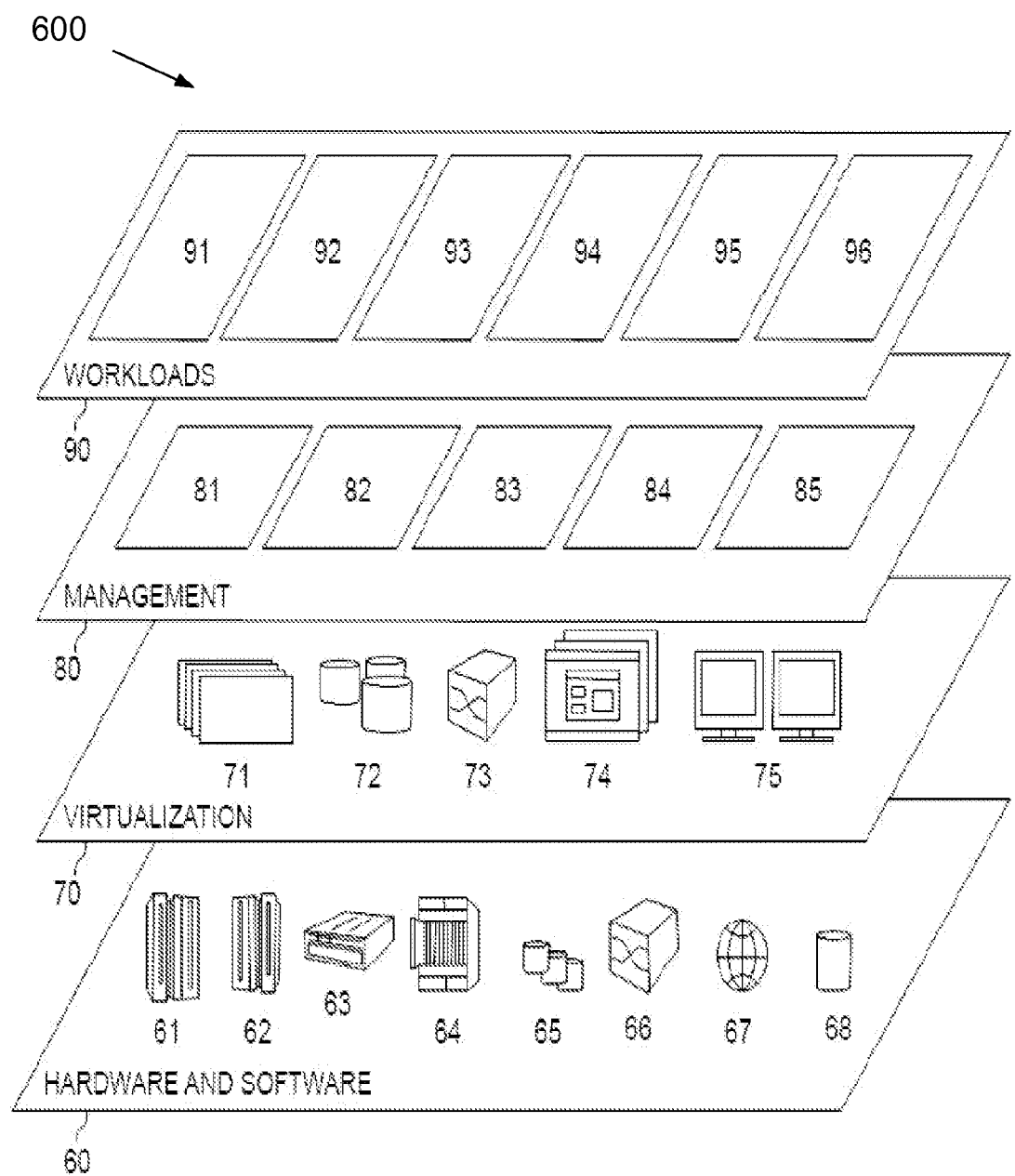
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Aggregate Functions Determination 96. An Aggregate Functions Determination Program 108A, 108B (FIG. 1) may be offered "as a service in the cloud" (i.e., Software as a Service (SaaS)) for applications running on mobile devices 102 (FIG. 1) and may determine and provide aggregate functions based on database tables.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining and providing a plurality of aggregate functions, the method comprising:
    scanning at least one database table;
    determining the plurality of aggregate functions associated with the at least one database table;
    storing the determined plurality of aggregate functions on at least one system catalog table;
    providing at least one indication that the stored determined plurality of aggregate functions are valid;
    receiving at least one database query associated with the at least one database table;
    based on the received at least one database query, determining whether the stored determined plurality of aggregate functions are valid;
    in response to the determination that the stored determined plurality of aggregate functions are valid, retrieving the stored determined plurality of aggregate functions from the at least one system catalog;
    in response to the determination that the stored determined plurality of aggregate functions are invalid, re-scanning the at least one database table;
    determining the plurality of aggregate functions based on the re-scanned at least one database table; and
    presenting the determined plurality of aggregate functions based on the re-scanned at least one database table and the stored determined plurality of aggregate functions retrieved from the at least one system catalog table to at least one client.

2. The method of claim 1, wherein scanning the at least one database is performed by a runstats command.

3. The method of claim 1, wherein the plurality of aggregate functions are selected from a group comprising at least one of a minimum calculation, a maximum calculation, a range calculation, and an average calculation.

4. The method of claim 1, wherein the at least one indication comprises at least one flag icon on at least one table control block that is associated with the stored determined plurality of aggregate functions.

5. The method of claim 1, wherein the received at least one database query is selected from a group comprising at least one of a minimum calculation query, a maximum calculation query, a range calculation query, and an average calculation query.

6. The method of claim 4, wherein determining whether the stored determined plurality of aggregate functions are valid further comprises:
    determining whether the at least one flag icon on the at least one table block is activated.

7. The method of claim 6, further comprising:
    detecting at least one of an update action, an insert action, and a delete action to the stored determined plurality of aggregate functions; and
    in response to the detection, deactivating the at least one flag icon to indicate that the stored determined plurality of aggregate function are not valid.

8. A computer system for determining and providing a plurality of aggregate functions, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    scanning at least one database table;
    determining the plurality of aggregate functions associated with the at least one database table;
    storing the determined plurality of aggregate functions on at least one system catalog table;
    providing at least one indication that the stored determined plurality of aggregate functions are valid;
    receiving at least one database query associated with the at least one database table;
    based on the received at least one database query, determining whether the stored determined plurality of aggregate functions are valid;
    in response to the determination that the stored determined plurality of aggregate functions are valid, retrieving the stored determined plurality of aggregate functions from the at least one system catalog;
    in response to the determination that the stored determined plurality of aggregate functions are invalid, re-scanning the at least one database table;
    determining the plurality of aggregate functions based on the re-scanned at least one database table; and
    presenting the determined plurality of aggregate functions based on the re-scanned at least one database table and the stored determined plurality of aggregate functions retrieved from the at least one system catalog table to at least one client.

9. The computer system of claim 8, wherein scanning the at least one database is performed by a command to update a plurality of catalog statistics.

10. The computer system of claim 8, wherein the plurality of aggregate functions are selected from a group comprising at least one of a minimum calculation, a maximum calculation, a range calculation, and an average calculation.

11. The computer system of claim 8, wherein the at least one indication comprises at least one flag icon on at least one table control block that is associated with the stored determined plurality of aggregate functions.

12. The computer system of claim 8, wherein the received at least one database query is selected from a group comprising at least one of a minimum calculation query, a maximum calculation query, a range calculation query, and an average calculation query.

13. The computer system of claim 11, wherein determining whether the stored determined plurality of aggregate functions are valid further comprises:

determining whether the at least one flag icon on the at least one table block is activated.

14. The computer system of claim 13, further comprising:
detecting at least one of an update action, an insert action, and a delete action to the stored determined plurality of aggregate functions; and
in response to the detection, deactivating the at least one flag icon to indicate that the stored determined plurality of aggregate function are not valid.

15. A computer program product for determining and providing a plurality of aggregate functions, comprising:
one or more computer-readable storage devices and program instructions stored on at least one of the one or more tangible storage devices, the program instructions executable by a processor, the program instructions comprising:
program instructions to scan at least one database table;
program instructions to determine the plurality of aggregate functions associated with the at least one database table;
program instructions to store the determined plurality of aggregate functions on at least one system catalog table;
program instructions to provide at least one indication that the stored determined plurality of aggregate functions are valid;
program instructions to receive at least one database query associated with the at least one database table;
based on the received at least one database query, program instructions to determine whether the stored determined plurality of aggregate functions are valid;
in response to the determination that the stored determined plurality of aggregate functions are valid, program instructions to retrieve the stored determined plurality of aggregate functions from the at least one system catalog;
in response to the determination that the stored determined plurality of aggregate functions are invalid, program instructions to re-scanning the at least one database table;
program instructions to determine the plurality of aggregate functions based on the re-scanned at least one database table; and
program instructions to present the determined plurality of aggregate functions based on the re-scanned at least one database table and the stored determined plurality of aggregate functions retrieved from the at least one system catalog table to at least one client.

16. The computer program product of claim 15, wherein the program instruction to scan the at least one database is performed by a command to update a plurality of catalog statistics.

17. The computer program product of claim 15, wherein the plurality of aggregate functions are selected from a group comprising at least one of a minimum calculation, a maximum calculation, a range calculation, and an average calculation.

18. The computer program product of claim 15, wherein the at least one indication comprises at least one flag icon on at least one table control block that is associated with the stored determined plurality of aggregate functions.

19. The computer program product of claim 18, wherein the program instructions to determine whether the stored determined plurality of aggregate functions are valid further comprises:
program instructions to determine whether the at least one flag icon on the at least one table block is activated.

20. The computer program product of claim 19, further comprising:
program instructions to detect at least one of an update action, an insert action, and a delete action to the stored determined plurality of aggregate functions; and
in response to the detection, program instructions to deactivate the at least one flag icon to indicate that the stored determined plurality of aggregate function are not valid.

* * * * *